Jan. 24, 1956 G. A. GAUM 2,732,229
WELDING PIPE COUPLING
Filed Aug. 13, 1951
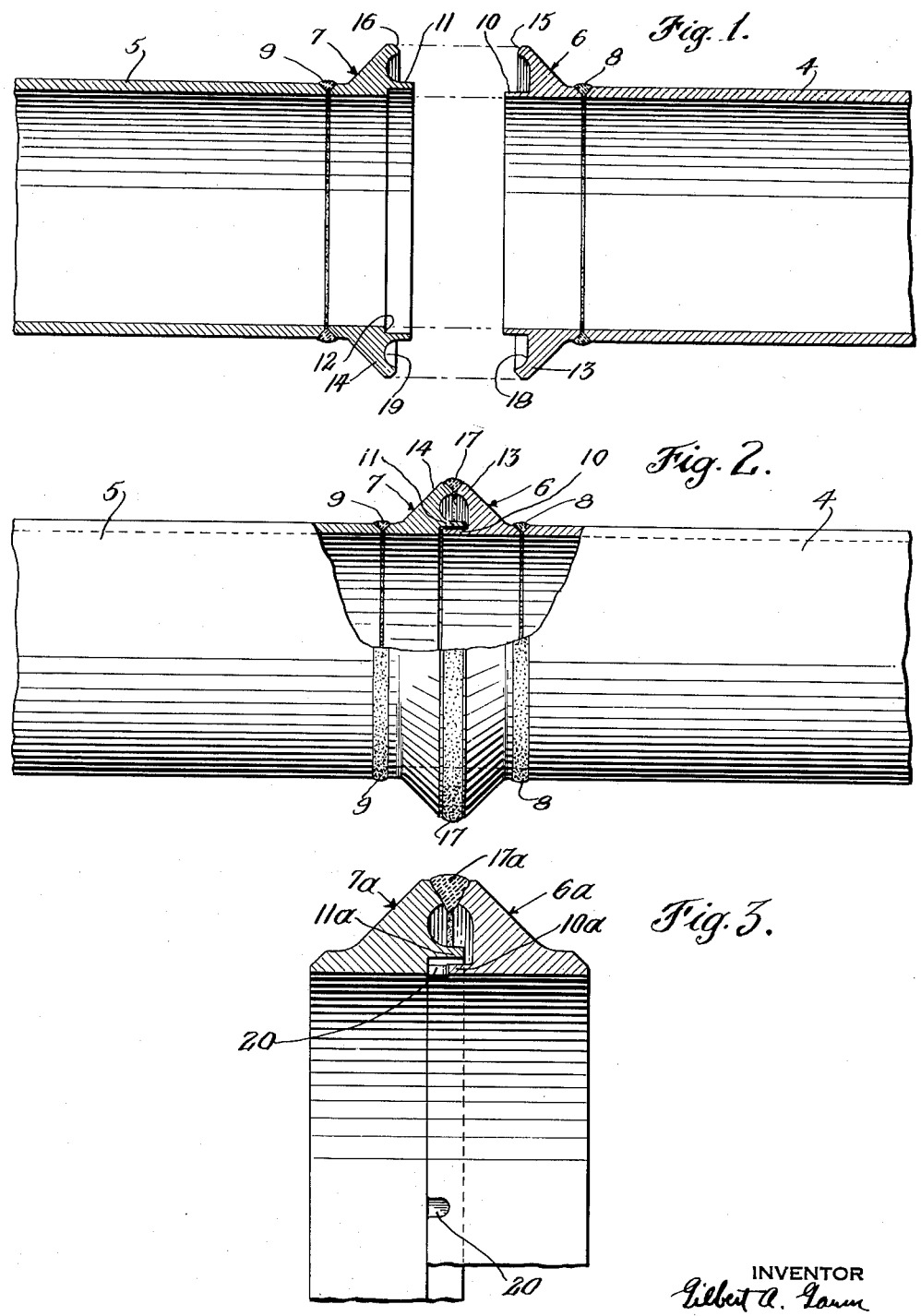
INVENTOR
Gilbert A. Gaum
BY
ATTORNEYS United States Patent Office 2,732,229
Patented Jan. 24, 1956

2,732,229

WELDING PIPE COUPLING

Gilbert A. Gaum, Louisville, Ky., assignor, by mesne assignments, to National Cylinder Gas Company, Chicago, Ill., a corporation of Delaware Application August 13, 1951, Serial No. 241,583

2 Claims. (Cl. 285—111)

This invention relates to pipe couplings and is especially concerned with the type of coupling which is adapted for welding in the field so as to complete the joint between pipe sections.

It is the general purpose of the invention to provide a pipe coupling of the kind referred to, which is not only of simple construction but also concurrently achieves several important objectives.

Thus, the invention provides a coupling or joint having a smooth interior surface conforming and constituting a continuation of the inner surface of the connected pipe sections, thereby eliminating obstruction or irregularity of the effective cross sectional area of the piping. This is of importance for a number of reasons, depending upon the particular use for which the piping is to be employed. For example, where the piping is used for fluid flow, the elimination of obstruction or irregularity in the cross sectional flow area eliminates danger of accumulation of deposits or the like at the joint and also reduces tendency for corrosion to develop. In the use of the piping as a conduit for electrical transmission lines, the elimination of projections is of importance in order to avoid possible damage to electrical conductors drawn through the piping.

In achieving the foregoing, the pipe joint or coupling of the invention provides an annular chamber lying just within the annular weld by which the joint is completed, which annular chamber will accommodate scale and pieces of the weld metal, such as the so-called "icicles" which are frequently formed during the welding operation. The annular chamber is provided with means of communication to the interior of the connected pipe sections, but the communicating passage is tortuous, to thereby prevent entrance of scale and weld metal to the interior of the joint.

Thus, complete penetration and therefore maximum strength of the annular weld completing the joint can be achieved without any danger of formation of icicles extending into the interior of the piping at the joint. Furthermore, the necessity for welding rings or chill rings, which are commonly used for preventing the formation of icicles, but which themselves constitute undesirable irregularities in the inner surface of pipe joints, is entirely eliminated.

The provision of a passageway between the interior of the piping and the annular chamber above mentioned is of importance in order to permit complete evacuation of the entire piping system, even including the annular chambers of the joints, in instances where the use of the piping system requires evacuation prior to introduction of some fluid to be conveyed therethrough. Such complete evacuation is particularly important where the piping is to serve as a conduit for electrical conductors, and the space surrounding the conductors within the piping is to be filled with a dielectric fluid such as oil. In electrical transmission systems of this type, the presence of a pocket of air in the dielectric fluid may cause electrical stresses resulting in failure of the system.

In accordance with another aspect of the invention, a fitting is secured to each end of each pipe section, preferably by a single simple weld, this operation advantageously being effected in the shop prior to the operations in the field. The field operations then comprise merely the bringing together of the pipe sections with their cooperating fittings and the making of a single simple weld readily accessible from the exterior of the joint. As will be apparent from the following description of the fittings forming the couplings of the invention, the pipe section can be readily and accurately aligned for the final welding operation without the necessity for welding rings or welding clamps.

How the foregoing and other objects and advantages are obtained will appear more fully from the accompanying drawing, in which—

Figure 1 is an axial sectional view of the adjacent ends of a pair of pipe sections, with the coupling fittings welded thereto, the two fittings being shown as axially aligned but somewhat separated;

Figure 2 is a view partly in elevation and partly in axial section showing the adjacent end fittings of a pair of pipe sections brought together and interconnected by a weld, to form a coupling or joint according to the invention; and Figure 3 is a fragmentary view, on an enlarged scale, illustrating a modified form of fittings usable according to the invention.

Referring first to the arrangement shown in Figures 1 and 2, a pair of pipe sections are illustrated at 4 and 5. Section 4 is provided with a fitting 6 and section 5 with a fitting 7, these two fittings having certain cooperating complementary portions and constituting in effect male and female parts of the joint. Each of the fittings is connected with the pipe section with which it is associated by means of a simple annular weld such as indicated at 8 and 9, which may conveniently be made in the shop. Whether made in the shop or in the field, these welds 8 and 9 are desirably ground off internally, so as to remove any scale, icicles or the like which might project within the effective cross sectional area of the piping.

Each of the fittings 6 and 7 has an inner annular surface conforming with the inner surface of the connected pipe section and constituting an extension thereof. Fitting 6 has an axially extending annular flange or projection 10, the inner surface of which is coaxial with the inner surface of the piping. Fitting 7 has a cooperating flange or projection 11 the inside diameter of which is preferably somewhat greater than the outside diameter of the flange 10 so that when the fittings are brought together as shown in Figure 2 a small annular space is provided between the overlapped flanges 10 and 11. Described in a somewhat different way, it may be said that the fitting 7 is provided with a counterbore or shouldered recess 12 accommodating the flange 10 when the joint parts are brought together.

The two fittings (6 and 7) are also provided with radially extending annular portions 13 and 14 with their outer extremities formed to project axially of the coupling to provide opposed surfaces 15 and 16 for cooperation with the metal of an annular weld shown in Figure 2 at 17. The portions 13 and 14 of the fittings thus have grooves 18 and 19 which cooperate to define an annular chamber surrounding the overlapped flanges 10 and 11. This annular chamber accommodates any excess weld metal which may flow inwardly from the weld bead 17 and also any scale formed during the welding operation, thus serving to isolate such weld metal and scale from the interior of the piping.

It will be noted from Figure 2 that when the joint parts are brought together into proper welding position, the radially projecting portions 13 and 14 are spaced somewhat from each other, and further that the diameter and axial dimension of the two flanges are such as to provide a tortuous passage interconnecting the annular chamber and the interior of the piping. This passage extends around the free edge of flange 11, through the annular space between the two flanges, and thence around the free edge of the flange 10. The interconnecting passageway is thus tortuous and is of such character that any molten weld metal entering the annular chamber surrounding the joint will freeze prior to passage between the flanges.

In the embodiment of Figure 3, the arrangement of the joint parts is similar to that described above. Here the two fittings are indicated at 6a and 7a and, as in the first form, the fittings are provided with portions adapted to cooperate with the annular weld 17a. Overlapping flanges 10a and 11a are again provided. In this form, however, flange 10a is of greater axial dimension than flange 11a to provide for abutting of the free edge of flange 10a against the base of the counterbore in the fitting 7a. This abutment assists in properly positioning the joint parts in assembling the coupling. To assure communication between the interior of the piping and the annular chamber within the joint, the flange 10a is desirably provided with portage, for instance notches or recesses such as shown at 20. These are desirably located in the region overlapped by the flange 11a, so as to avoid passage of weld metal from the annular chamber into the interior of the piping.

I claim:

1. A welding coupling for interconnecting the ends of a pair of conduit elements comprising a generally tubular female fitting and a generally tubular male fitting, each of said fittings being adapted to be connected respectively with the end faces of the conduit elements and having an inner surface conforming with the inner surface of the connected conduit element, said male fiting having an annular projection extending axially from the inner edge of the mating face thereof and adapted to project into a recess provided by a counterbore in the mating face of said female fitting with its end surface abutting the bottom surface of the recess to provide a conduit having uniform interior wall surfaces through both of said fittings when said fittings are in mating relation, said fittings further having radially extending annular portions spaced from each other and formed to provide opposed surfaces for cooperation with the metal of an annular weld when said fittings are in abutting mating relation as described, and said fittings cooperating to define an annular chamber generally surrounding the abutting surfaces, which chamber is adapted to accommodate excess weld metal which may flow inwardly from the weld between the opposed spaced surfaces.

2. A pipe coupling for interconnecting the ends of a pair of conduit elements, comprising a pair of fittings, each being adapted to be connected respectively with the end faces of the conduit elements and having an inner surface conforming with the inner surface of the connected conduit element, one of said fittings having an annular projection extending axially from the inner edge of the mating face thereof and adapted to project into a recess provided by a counterbore in the mating face of the other of said fittings with its end surface and the bottom surface of the recess abutting to provide a conduit having uniform interior wall surfaces through both of said fittings when said coupling is assembled, said fittings further having radially extending annular portions spaced from each other and formed to provide opposed surfaces for cooperation with the metal of an annular weld, the length of said annular axially extending projection being such as to maintain proper spacing of said opposed surfaces, said opposed surfaces being remote from the abutting surfaces when the coupling is assembled whereby to permit contraction of the weld upon cooling without undesirable stress concentration, and said fittings cooperating to define an annular chamber generally surrounding said abutting surfaces, which chamber is adapted to accommodate excess weld metal which may flow inwardly from the weld between the opposed spaced surfaces.

References Cited in the file of this patent

UNITED STATES PATENTS

| 506,484 | Ewing | Oct. 10, 1893 |
| 1,246,091 | Haller | Nov. 13, 1917 |
| 1,810,902 | Burnish | June 23, 1931 |
| 1,926,517 | Filippi | Sept. 12, 1933 |
| 1,937,239 | McWane | Nov. 28, 1933 |

FOREIGN PATENTS

| 202,300 | Switzerland | Apr. 1, 1939 |
| 588,987 | Great Britain | June 9, 1947 |